United States Patent
Guo et al.

(10) Patent No.: US 7,921,085 B2
(45) Date of Patent: Apr. 5, 2011

(54) METHOD AND SYSTEM FOR QUANTIFYING A DATA PAGE REPETITION PATTERN FOR A DATABASE INDEX IN A DATABASE MANAGEMENT SYSTEM

(75) Inventors: Shuanglin Guo, Cupertino, CA (US); Terence P. Purcell, Springfield, IL (US); Yoichi Tsuji, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 11/691,309

(22) Filed: Mar. 26, 2007

(65) Prior Publication Data
US 2008/0243761 A1 Oct. 2, 2008

(51) Int. Cl.
*G06F 7/00* (2006.01)
*G06F 17/00* (2006.01)

(52) U.S. Cl. .................................. 707/688; 707/696
(58) Field of Classification Search .................. 707/100
See application file for complete search history.

(56) References Cited

U.S. PATENT DOCUMENTS

| | | | | |
|---|---|---|---|---|
| 5,627,994 A * | 5/1997 | Levy et al. | ..................... | 711/150 |
| 5,822,749 A * | 10/1998 | Agarwal | ................. | 707/999.002 |
| 5,960,423 A * | 9/1999 | Chaudhuri et al. | ............. | 707/715 |
| 6,421,664 B1 * | 7/2002 | Groeschel et al. | ................. | 707/3 |
| 6,470,330 B1 | 10/2002 | Das et al. | ............................ | 707/2 |
| 6,549,895 B1 | 4/2003 | Lai | ..................... | 707/2 |
| 6,668,263 B1 | 12/2003 | Cranston et al. | ............... | 707/205 |
| 7,024,422 B2 | 4/2006 | Abdo | ............................ | 707/102 |
| 7,039,646 B2 | 5/2006 | Lee et al. | ....................... | 707/101 |
| 7,512,591 B2 * | 3/2009 | Bildhaeuser et al. | .. | 707/999.002 |
| 7,694,070 B2 * | 4/2010 | Mogi et al. | ..................... | 711/112 |
| 2004/0148273 A1 | 7/2004 | Allen et al. | ......................... | 707/2 |
| 2004/0193803 A1 * | 9/2004 | Mogi et al. | ..................... | 711/129 |
| 2005/0071366 A1 * | 3/2005 | Hobson et al. | ................ | 707/102 |
| 2005/0131853 A1 * | 6/2005 | Sampath et al. | ................... | 707/1 |
| 2006/0155681 A1 * | 7/2006 | Chiang et al. | ...................... | 707/3 |
| 2006/0155752 A1 | 7/2006 | Hrle et al. | ....................... | 707/102 |
| 2007/0208604 A1 * | 9/2007 | Purohit et al. | ..................... | 705/9 |
| 2008/0086446 A1 * | 4/2008 | Zhang et al. | ....................... | 707/2 |
| 2008/0282057 A1 * | 11/2008 | Layden et al. | ................. | 711/210 |

OTHER PUBLICATIONS

"An Introduction t DB₂ Indexing" Mullins, C.S., DBAzine.com http://www.dbazine.com/db2/db2-mfarticles/mullins-db2indexing, Jan. 7, 2007.

(Continued)

*Primary Examiner* — Mohammad Ali
*Assistant Examiner* — Kannan Shanmugasundaram
(74) *Attorney, Agent, or Firm* — Kunzler Needham Massey & Thorpe

(57) ABSTRACT

A method and system are presented for quantifying a data page repetition pattern for a database index in a database management system. In one embodiment, the method includes identifying a database index to provide a basis for collecting a data page repetition statistic, the database index having a database index key. The method may also include collecting the data page repetition statistic based on the database index key, wherein the data page repetition statistic quantifies a data page repetition pattern associated with database queries that reference sequential entries of the database index. The method may further include optimizing a data page access process based on the data page repetition statistic. In a further embodiment, the method may utilize both cluster ratio and data page repetition statistics to evaluate data page I/O and CPU cost.

24 Claims, 7 Drawing Sheets

OTHER PUBLICATIONS

"Performance Evaluation of Centralized and Distributed Index Schemes for a Page Server OODBMS" Basu, J. et al., Mar. 19, 1997.

"Sliding Window Query Processing over Data Streams" Golab, L., Technical Report, University of Waterloo, Aug. 2006.

* cited by examiner

| Page # 1 | | Page # 2 | | Page # 3 | | ...... | Page # 100 | |
|---|---|---|---|---|---|---|---|---|
| Acct | Gender | Acct | Gender | Acct | Gender | | Acct | Gender |
| 1 | F | 11 | F | 21 | M | | 991 | M |
| 2 | M | 12 | M | 22 | F | | 992 | F |
| 3 | M | 13 | F | 23 | F | | 993 | M |
| .... | .... | .... | .... | .... | .... | | ..... | .... |
| 10 | F | 20 | M | 30 | M | | 1000 | F |

FIG. 1A
(Prior Art)

Index1 — Key (Acct)

| Key | 1 | 2 | 3 | ... | 10 | 11 | 12 | 13 | ... | 20 | 21 | 22 | 23 | ... | 30 | ... | 991 | 992 | 993 | ... | 1000 |
|---|---|---|---|---|---|---|---|---|---|---|---|---|---|---|---|---|---|---|---|---|---|
| Page # | 1 | 1 | 1 | 1 | 1 | 2 | 2 | 2 | 2 | 2 | 3 | 3 | 3 | 3 | 3 | ... | 100 | 100 | 100 | 100 | 100 |

FIG. 1B
(Prior Art)

Index2 — Key (Gender, Acct)

| Key | F,1 | F,10 | F,11 | F,13 | F,22 | F,23 | F,992 | F,1000 | M,2 | M,3 | M,12 | M,20 | M,21 | M,30 | M,991 | M,993 |
|---|---|---|---|---|---|---|---|---|---|---|---|---|---|---|---|---|
| Page # | 1 | 1 | 2 | 2 | 3 | 3 | 100 | 100 | 1 | 1 | 2 | 2 | 3 | 3 | 100 | 100 |

METHOD AND SYSTEM FOR QUANTIFYING A DATA PAGE REPETITION PATTERN FOR A DATABASE INDEX IN A DATABASE MANAGEMENT SYSTEM

BACKGROUND OF THE INVENTION

1. Field of the Invention

This invention relates to database management systems and more particularly relates to quantifying a data page repetition pattern for a database index in a database management system.

2. Description of the Related Art

There are two main types of database files, flat files and relational database files. Flat databases store data in a delimited text file. A typical flat database is delimited using a tab, coma, semicolon, or other special character. The delimiter separates database entries. A typical database entry contains multiple pieces of information called fields that are typically related in some way. For example, a tab delimited flat database file might include directory information, where a tab separates each entry. In this example, the entries probably contain a name, address, and phone number for each person in the directory. Unfortunately, searching flat databases generally wastes time and system resources, because each and every piece of information for every entry is typically scanned until the correct entry can be located.

An improved database organization method, commonly referred to as a relational database, emerged in the 1970s. The relational database arranges data in tables. The tables typically include columns and rows. In the example above, the directory entries may be entered in rows, such that the name is in the first column, the address in the second column, and the phone number in the third column for each entry in the relational database. A database index is a data structure that improves the speed of operations in a table. Indexes can be created using one or more columns. The disk space required to store the index is typically less than the storage of the table. Particularly, the index data structure may be created by copying a column of data from the table into a temporary storage device or memory. The index may include pointers, pointing to the entries associated with index key values. The index enables a Database Management System (DBMS) to more effectively search the database. For example, if a user of the directory database described above wants to find the phone number and address associated with a particular name in the directory, the DBMS may search a name index derived from the name column of associated tables to locate an entry associated with the particular name. Once the name is found in the index, the complete entry may be retrieved from the database by following the pointer associated with the index value. This search will be faster and more efficient because only the index corresponding to the name column is searched.

In a typical database, a predetermined amount of data is stored together on a storage volume in a group referred to as a data page. Data pages may be stored on a hard disk, array of hard disks, or other storage subsystem. Alternatively, data pages are stored on tape storage devices, or other storage media. The data pages are typically retrieved by the DBMS and cached in a temporary storage device such as Random Access Memory (RAM) which is used when the DBMS is searching for data.

Despite these improvements in database searching, system resource usage continues to be a common problem. For example, databases commonly used in corporations may include thousands or millions of entries. Additionally, the DBMS may have several users attempting to access these large databases simultaneously. Therefore effective system resource management becomes a problem. In such an example, a user typically submits a query to the DBMS which identifies the specific entry to search for, and the index to use for the search. If the database is larger than the capacity of the DBMS cache, the DBMS typically caches and searches a portion of the database at a time. If several users submit queries simultaneously, the number of data pages that can be cached for each search is reduced. These limitations typically impact system performance, search time, and the like.

In order to improve database performance, some systems include query optimization functions. A typical optimization function determines which database index to use and/or which data pages to cache for a specific query based on a database size statistic, a database query selectivity statistic, and a data clustering statistic. In a typical system, these three database statistics are collected during an offline collection process.

To illustrate these statistics, FIG. 1A illustrates a common relational database table. Each entry of the database table of FIG. 1A includes two fields, 1) the account number, and 2) the gender of the person associated with that account number. The account numbers are arranged in a column and the gender is arranged in a column. Each entry represents a row of the database table. The database table is separated into data pages, each page containing 10 rows of data. The complete database table includes 100 pages of data, which contain a total of 1000 entries. These values represent example size statistics.

In a common query, the DBMS finds entries associated with query criteria using the index. In this example, either the account number or the gender column may be used as the index for searching the database. Indeed, some combined indexes may include data from both columns. The DBMS determines whether an index keyed on account number or one keyed on gender and account number will be most effective (less costly) for satisfying the query. FIG. 1B illustrates an indexed keyed by account number. Each key value is associated with the page number that includes the associated row for the table illustrated in FIG. 1A. The query returns the page number where each record is found corresponding to the account number in the index. Since, the database of FIG. 1A is ordered in sequence by the account number, the index and the results of this query are order in sequence from page one to page one hundred. Additionally, since the data is sequential, the DBMS only needs to scan the index of FIG. 1B associated with the database of FIG. 1A once to identify every entry associated with the query.

Every page in the database of FIG. 1A includes exactly ten entries corresponding to an account number, and the account numbers are sequential. Therefore, the database has a cluster factor or cluster ratio of 100% with relation to the account number. The cluster factor is a composite statistic based on the density and sequential nature of the data in the database corresponding to a specific index. Cluster factors are commonly used in cost-based optimization processes.

FIG. 1C illustrates an index defined as gender by account number. The DBMS searches the entire index searching first by gender and then by account number. So for example, the first entry which includes female as the gender is found on the first row of the first page. However, the second entry is found on the tenth row of the first page. Since the account number is sequential, the results are still sequential, but the data is not as dense as the data returned from the query illustrated in FIG. 1B. Therefore, the cluster factor of this index is less than 100%.

While the cluster factor does provide cost information which is useful information regarding the sequential nature, the cluster factor does not provide a complete picture. For example, as illustrated in FIG. 1C, depending on the query, the DBMS may be required to load the entire database twice to identify all of the entries listed by order in the index. The first scan may identify all of the female entries by account number, and the second scan may identify all of the male entries by account number. The cluster factor does not provide any information regarding the number of times a data page must be referenced to complete the query, however, this information would be useful in a cost-based optimization process.

SUMMARY OF THE INVENTION

The present invention has been developed in response to the present state of the art, and in particular, in response to the problems and needs in the art that have not yet been fully solved by currently available database management systems. Accordingly, the present invention has been developed to provide a method and system for quantifying a data page repetition pattern for a database index in a database management system that overcome many or all of the above-discussed shortcomings in the art.

A method is presented for quantifying a data page repetition pattern for a database index in a database management system. In one embodiment, the method includes identifying a database index to provide a basis for collecting a data page repetition statistic, the database index having a database index key. The method may also include collecting the data page repetition statistic based on the database index key, wherein the data page repetition statistic quantifies a data page repetition pattern associated with database queries that reference sequential entries of the database index. The method may further include optimizing a data page access process based on the data page repetition statistic.

In a further embodiment, collecting the data page repetition statistic also includes conducting a statistic collection scan of a database index to identify a data storage page identifier for a data entry corresponding to each database index key value, the statistic collection scan examining entries in the identified database index, the identified database index ordered by database index key. Collecting may also include incrementing a counter in response to a determination that a data entry corresponding to a next database index key value is stored on a different data storage page than a data entry for a current database index key value.

In an alternative embodiment, collecting the data page repetition statistic includes defining a logical window to represent a set of database pages, the logical window beginning at a first data page associated with a first index key in the database index and having a size of one database page that stores a data entry corresponding to the first index key value. Collecting the statistic may also include increasing the size of the logical window up to a maximum size in response to a determination that the statistic collection scan references a data page not included within the logical window, and incrementing a counter in response to a determination that one of the size of the logical window and a position of the logical window is adjusted due to the statistic collection scan.

In a further embodiment of the method, the maximum size comprises a value equal to the number of data pages that are cached when a database is accessed in an operational environment, and wherein the set of data pages in the logical window do not incur a persistent memory cost. The position of the logical window may adjust to a subsequent database index key value and the size adjusts to a size of one database page in response to the statistic collection scan referencing a data page not included within the logical window and the size equaling the maximum size. The data page repetition statistic may be defined by a value of the counter that exceeds a number of unique database pages referenced by entries of a scanned database index. Additionally, a minimum value of the counter comprises a number of unique database pages scanned by the statistic collection scan, and a maximum value of the counter comprises the number of data rows of a scanned database index scanned by the statistic collection scan.

In a further embodiment of the method, collecting the data page repetition statistic and optimizing the data page access process is managed autonomously by a relational database management system, and wherein the collection of the data page repetition statistic is performed during a period of minimal database activity. In another embodiment, optimizing the data page access process is further based on at least one of a database size statistic, a database query selectivity statistic, and a data clustering statistic, and collecting the data page repetition statistic may be conducted substantially simultaneously with a statistic collection process for at least one of the database size statistic, the database query selectivity statistic, and the data clustering statistic.

A computer program product is also presented for quantifying a data page repetition pattern for a database index in a database management system. When executed, the computer programmable product may identify a database index to provide a basis for collecting a data page repetition statistic, the database index having a database index key. Additionally, the computer programmable product may collect the data page repetition statistic based on the database index key. Collecting the data page repetition statistic may include conducting a statistic collection scan of a database index to identify a data storage page identifier for a data entry corresponding to the database index key value, the statistic collection scan examining entries in the identified database index, and incrementing a counter in response to a determination that a data entry corresponding to the database index key value has been identified on a new data storage page. In a further embodiment, the computer programmable product may optimize a data page access process based on the data page repetition statistic.

A database management system is also presented for quantifying a data page repetition pattern for a database index in a database management system. The database management system may include a relational database management system, a data manager, and a buffer manager. In one embodiment, the relational database management system identifies a database index to provide a basis for collecting a data page repetition statistic, the database index having a database index key. Additionally, the relational database management system may collect the data page repetition statistic based on the database index key, wherein collecting the data page repetition statistic comprises triggering a statistic collection scan of a database index to identify a data storage page identifier for a data entry corresponding to the database index key value, the statistic collection scan examining entries in the identified database index, and incrementing a counter in response to a determination that a data entry corresponding to the database index key value has been identified on a new data storage page. In a further embodiment, the relational database management system may optimize a data page access request based on the data page repetition statistic. The data manager may receive the data page access request from the relational database management system. The buffer manager may load data stored in a storage volume into a data access buffer in response to the data page access request.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 1A is a tabular representation of a relational database table of the prior art;

FIG. 1B is a tabular representation of an index of the relational database illustrated in FIG. 1A;

FIG. 1C is another tabular representation of another index of the relational database illustrated in FIG. 1A;

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 2:
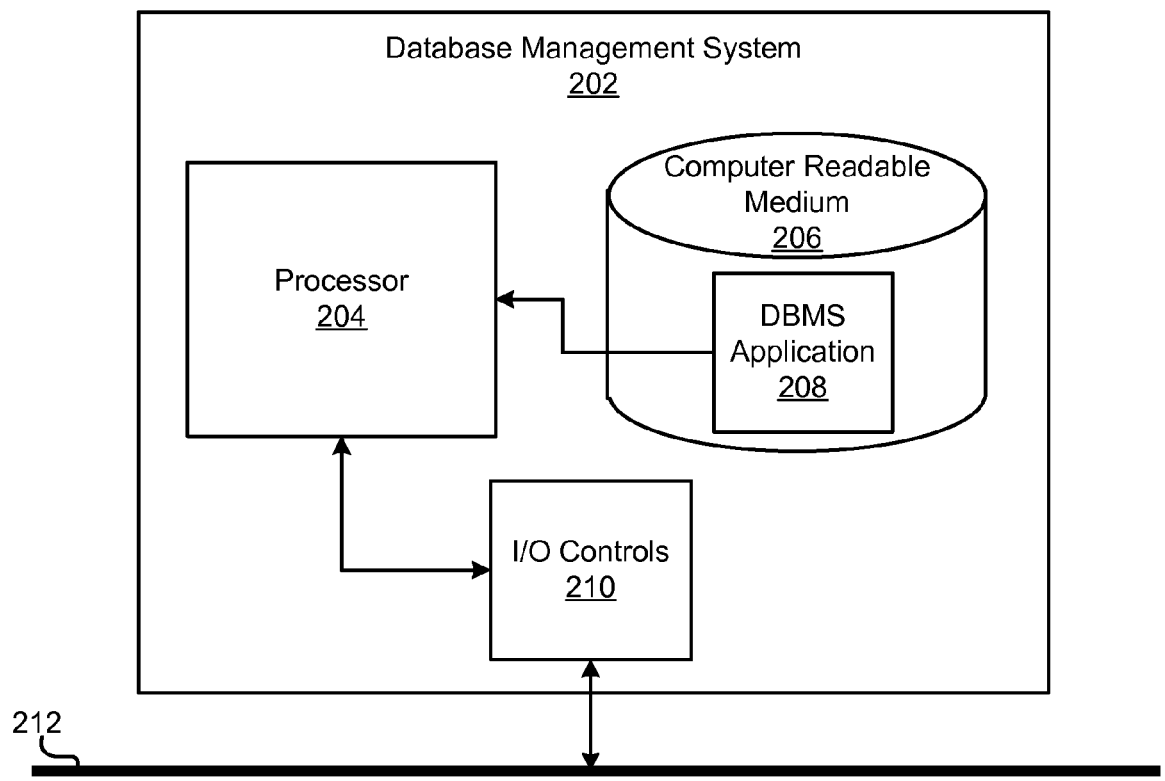
FIG. 2 is a schematic block diagram illustrating one embodiment of a database management system.

FIG. 2 illustrates one embodiment of a database management system 202. The database management system 202 may control access to a database. Additionally, the database management system may interface with a database user. For example, the database management system 202 may handle access requests, queries, and the like from users of the database. In one specific example, the database management system 202 may receive a query request from a user. The database management system 202 may then retrieve data corresponding to the query request from the database. The database management system 202 may include a processor 204, a computer readable medium 206, and Input/Output (I/O) controls 210. In a further embodiment, the database management system 202 may connect to a data communication channel 212 such as a data bus, network connection, Small Computer System Interface (SCSI) connection, or the like.

In one embodiment, the processor 204 retrieves a DBMS Application 208 from the computer readable medium 206, and executes the DBMS application 208 to perform database management tasks. The processor 204 may include an Intel®, AMD®, or similar commercially available product. In a further embodiment, the processor 204 may include multiple processing cores.

The DBMS application 208 may manage user access to a managed database. In one embodiment, the DBMS application 208 is a relational DBMS (RDBMS). In such an embodiment, the DBMS application 208 may handle access to data pages containing data in rows and columns as described above with relation to FIG. 1A. Additionally, the DBMS application 208 may handle database access requests from database users. For example, the DBMS application 208 may receive a database query request from a user. In response to receiving the query request, the DBMS application 208 may access database data, locate data in the database corresponding to the query request, and return or display the data back to the user.

In a further embodiment, the DBMS application 208 identifies a database index to provide a basis for collecting a data page repetition statistic. As used herein, the term "data page repetition statistic" refers to a statistic collected for cost-based optimization of database searches, the statistic quantifying a data page repetition pattern for a database index in a database management system. In one embodiment, the statistic may include a quantity corresponding to the number of times a data page is accessed when a certain index is used. In further embodiments, as described below with relation to FIGS. 3 and 4, the statistic may include a quantity corresponding to the number of times a data page would need to be cached into a cache memory during an operational database search. The database index includes a database index key. For example, as described above with relation to FIG. 1B, the index may include an account number, a name, a gender, or the like as the key. The DBMS application 208 collects the data page repetition statistic based on the database index key. Collecting the data page repetition statistic may include conducting a statistic collection scan of a database index to identify a data storage page identifier for a data entry corresponding to the database index key value. In a further embodiment, the statistic collection scan examines entries in the identified database index. Furthermore, collecting may include incrementing a counter in response to a determination that a data entry corresponding to the database index key value has been identified on a new data storage page. As used herein the term "new data storage page" refers to a data page which is referenced in a scan of the data storage pages associated with the database index. As discussed further with reference to FIGS. 3 and 4 below, the term "new data storage page" may additionally include a data page which has been referenced in a scan of the storage pages, but which is not within the current range of a logical window. In a certain embodiment, the data page repetition statistic corresponds to the value of the counter when the scan is complete. Once the data page repetition statistic is collected, the DBMS application 208 uses the data page repetition statistic to determine a data page access process and/or to select a database index for use in satisfying the database query. In one embodiment, the optimal index is determined by an optimization function of the DBMS application 208 based on a data page repetition statistic value for each identified index. Further embodiments of this process are described with reference to the Figures that follow.

The computer readable medium 206 may store the DBMS application 208. Additionally, a computer readable medium 206 may cache data from the database for use by the DBMS application 208. For example, where the database is stored on a hard disk, the DBMS application 208 causes portions of the database to be cached in the computer readable medium 206 for faster access during database operations. The computer readable medium 206 may include a RAM device, a flash memory device, and other volatile and non-volatile data storage devices.

The database management system 202 may additionally include a set of I/O controls 210. The I/O controls 210 may provide an interface for a user or system administrator to interact with the database. Additionally, the I/O controls 210 may provide access to a remote storage volume containing data for the database. The I/O controls 210 may additionally provide a Graphical User Interface (GUI) for user interaction. In one embodiment, the I/O controls 210 include network connectors, SCSI connectors, mouse connectors, keyboard connectors, video connectors, and the like. The I/O controls 210 may additionally connect to the processor 204 and respond to commands from the processor 204.

Figure 3:
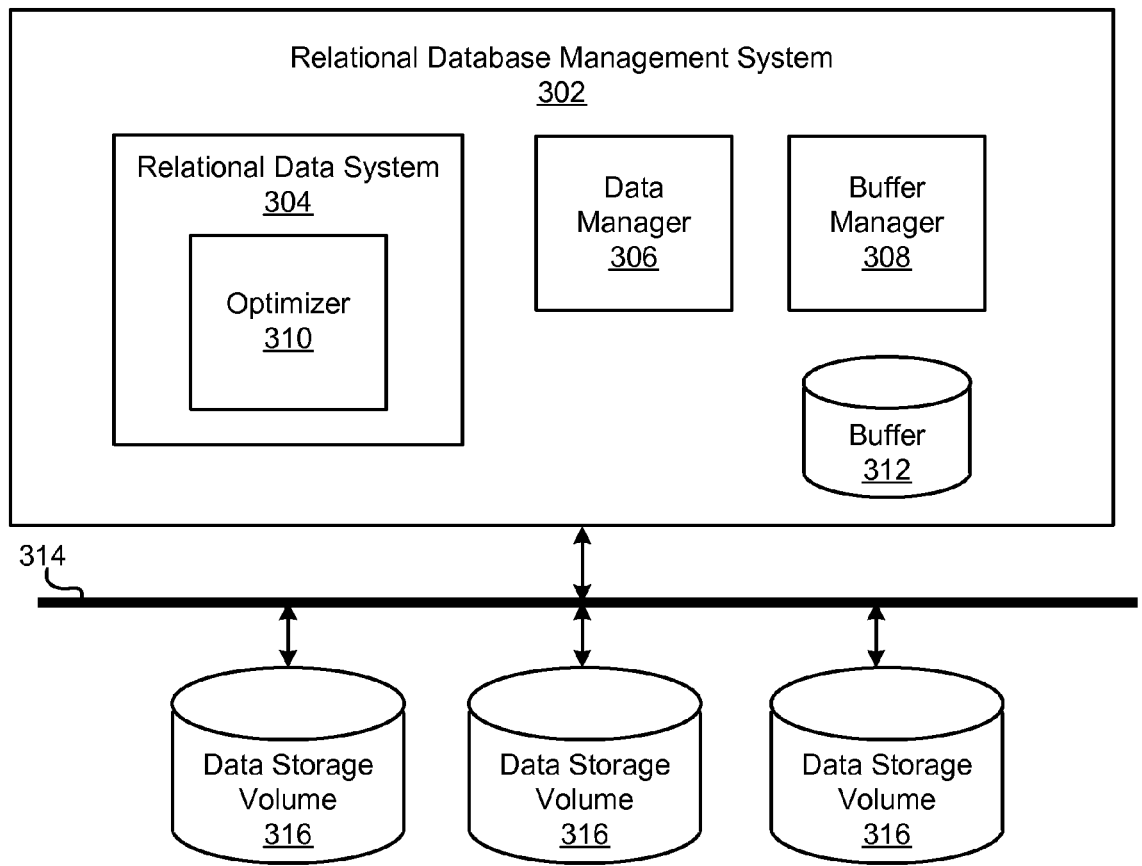
FIG. 3 is a schematic block diagram illustrating one embodiment of a relational database management system.

FIG. 3 illustrates one embodiment of an RDBMS 302. The RDBMS 302 may control organization of data in a database into relational tables. Additionally, the RDBMS 302 may control access to the database files. In one embodiment, the RDBMS 302 includes a relational database management system 304, a data manager 306, and a buffer manager 308. In a further embodiment, the RDBMS 302 may include a buffer 312. The RDBMS 302 may couple to one or more data storage volumes 316 via a data connection 314. In a further embodiment, the relational database management system 304, the data manager 306, and the buffer manager 308 are implemented in software. For example, these components may be implemented as modules or components of a DBMS application 208. In such an embodiment, the processor 204 may load and execute the relational database management system 304, the data manager 306, and the buffer manager 308 components. In an alternative embodiment, these components may be implemented in firmware or hardware running in conjunction with the DBMS application 208.

In a particular embodiment, the relational database management system 304 may identify an index as a basis for collecting a data page repetition statistic. The relational database management system 302 may then collect the data page repetition statistic by triggering a statistic collection scan of the database and incrementing a counter when an entry corresponding to the index is found on a new data page. In an alternative embodiment, the data manager 306 may automatically scan the database index to collect the data page repetition statistic in accordance with prescheduled statistic collection processes. In one embodiment, collecting the data page repetition statistic may not incur additional system overhead, because the collection process for the data page repetition process may be conducted during a collection process for other database statistics.

When a Structured Query Language (SQL) query requesting a set of columns and rows from the database is passed to the relational database management system 304, the relational database management system 304 determines the best process for satisfying the request. In one embodiment, the relational database management system 304 may parse a SQL statement and determine its specified operations. These operations may include any of the features supported by a relational database, such as selection, projection, or join.

In a further embodiment, the relational database management system 304 may include an optimizer 310 for optimizing a data page access request based on the data page repetition statistic. Alternatively, the optimizer 310 may be separated from the relational database management system 304 into a distinct module or component of a storage area network or database management system. The optimizer 310 may provide cost-based query optimization. In one embodiment, the optimizer 310 may use one or more database statistics to perform a cost-based optimization analysis for data page access. For example, in addition to considering the data page repetition statistic, the optimizer 310 may optimize query execution based on a database size statistic, a database query selectivity statistic, and a data clustering statistic. In a further embodiment, the method may utilize both cluster ratio and data page repetition statistics to evaluate data page I/O and CPU cost. These statistics may be collected at substantially the same time as a database statistics collection process. In one further embodiment, a database administrator manages collection of the data page repetition statistic. In other words a database administrator may manually initiate a process for collecting a data page repetition statistic.

In an alternative embodiment, these processes may be carried out by the relational database management system 304 autonomously. As used herein, the term "autonomous" means triggered, initiated, or carried out independent of a database administrator or other user input. Although a database administrator may configure an autonomous action, later execution of the autonomous action is carried out without further interaction with the database administrator.

Furthermore, the data page repetition statistic may be collected during a period of minimal database activity. Since the statistic collection process may include resource intensive processes, collection may be scheduled to automatically execute at a time when system usage is low, thereby reducing user impact. In a further embodiment, the statistic collection process may be carried out at substantially the same time as other database administration and management tasks, including processes for collecting other database statistics.

The relational database management system 304 may also check user authorization, translate the data element names being accessed into internal identifiers, check the syntax of the SQL, and optimize the SQL creating an access path. The relational database management system 304 then passes the optimized SQL statement to the data manager 306.

The data manager 306 analyzes rows of data. In one specific embodiment, the data manager 306 may respond to a trigger from the relational database management system 304 requesting database statistic collection. In response to the trigger, the data manager 306 may conduct a statistic collection scan of a database index to identify a data storage page identifier for a data entry corresponding to each database index key value. Specifically, the data manager 306 may examine entries in the identified database index. Additionally, the data manager 306 may increment a counter in response to a determination that a data entry corresponding to a next database index key value is stored on a different data storage page than a data entry for a current database index key value. Additionally, the data manager 306 analyzes requests for data, and calls the buffer manager 308 to satisfy the request.

The buffer manager 308 may load data stored in a storage volume 316 into a data access buffer 312 in response to receiving the request from the data manager 306. The data access buffer 312 may also be referred to as a cache. In one embodiment, the buffer manager 308 uses pools of memory set aside for caching or pre-fetching frequently accessed data pages in order to create an efficient data access environment. When the data manager 306 passes a data access request to the buffer manager 308, the buffer manager 308 may determine whether the data is in the appropriate buffer pool. If so, the buffer manager 308 accesses the data and sends the data to the data manager 306. If the data is not in the buffer pool, the buffer manager 308 accesses the data storage volume 316 to retrieve the data. In one embodiment, the buffer manager 308 may cache the page referenced in the scan into the buffer 312, as well as additional data pages as determined by the optimizer 310.

In a further embodiment, the RDBMS 302 may collect the data page repetition statistic by conducting a statistic collection scan of a database index to identify a data storage page identifier for a data entry corresponding to each database index key value. The identified database index is ordered by a database index key, and the statistic collection scan examines entries in the identified database index in order.

Figure 4:
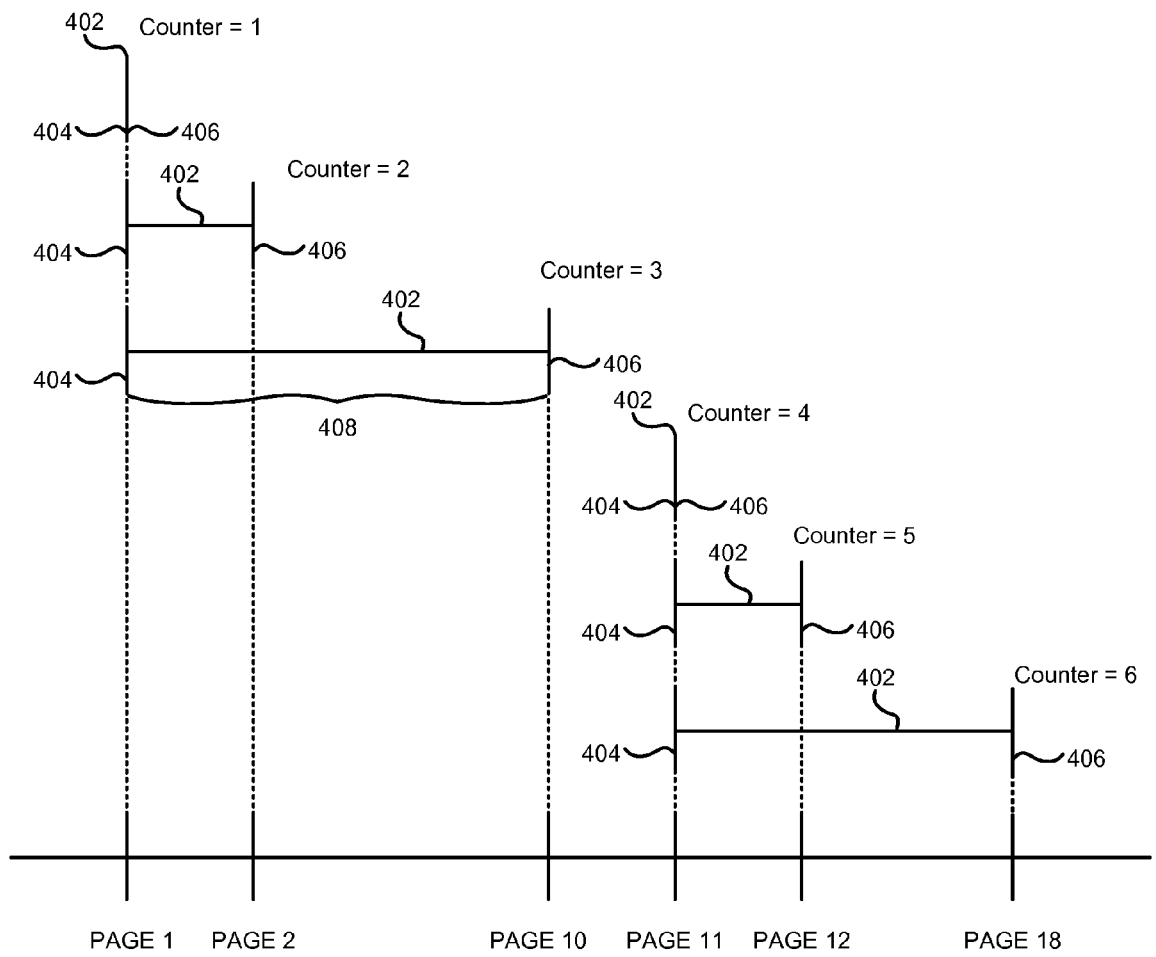
FIG. 4 is a logical diagram illustrating one embodiment of a logical window for collecting a data page repetition statistic.

Additionally, as illustrated in FIG. 4, during a statistic collection scan, the RDBMS 302 may define a logical window 402 to represent a set of database pages. In one embodiment, the logical window 402 represents the data pages that may be cached in the buffer 312 during normal database operation. The logical window 402 may begin at a first data page associated with a first index key in the database index. In such an embodiment, the logical window 402 has a size of one database page that stores a data entry corresponding to the first index key value. The RDBMS 302 increases the size of the logical window 402 up to a maximum size 408 in response to a determination that the statistic collection scan has referenced a data page not included within the logical window 402.

In a further embodiment, the RDBMS 302 includes a counter. The RDBMS increments the counter in response to a determination that one of the size of the logical window 402 and a position of the logical window 402 is adjusted due to the statistic collection scan. For example, the counter may increment when a logical window 402 is created, when the size of the logical window 402 changes, or when the position of the logical window 402 changes.

The data page repetition statistic may be defined by the value of the counter. The data page repetition statistic defines the amount of repetition of data pages a given database index exhibits. Consequently, the value of the data page repetition statistic extends over a range from a minimum value to a maximum value. The minimum and maximum values are reflected in the counter. In one embodiment, the value of the counter represents the number of database pages referenced by entries of a scanned database index. In such an embodiment, the minimum value of the counter is equal to the number of unique database pages scanned by the statistic collection scan. Typically, the minimum value of the data page repetition statistic is less than the number of rows in the scanned database index. In a database index unoptimized with respect to data page repletion, the maximum value of the counter may equal the total number of rows in the scanned database index.

The logical window 402 increases in size until the logical window 402 reaches a maximum size 408. The size of the logical window 402 may increase to simulate the number of data pages that may be cached during normal database operation. The maximum size 408 may be equal to the number of data pages that can be cached when a database is accessed in an operational environment. For example, the maximum size 408 of the logical window 402 may correspond to a maximum buffer 312 capacity of the operational database system. Representative examples of the maximum size 408 may include but are not limited to 32 megabytes, 128 megabytes, 512 megabytes, or the like. In such an embodiment, the set of data pages represented by the logical window 402 do not incur a persistent memory access cost.

In a further embodiment, the position of the logical window 402 adjusts to a subsequent database index key value and the size adjusts to a size of one database page in response to the statistic collection scan referencing a data page not included within the logical window 402 and the size equaling the maximum size 408. The size and/or position of the logical window 402 may change in order to model the dynamics of data page caching during normal database operations. For example, if the index represented by the table of FIG. 1C is scanned for collection of the data page repetition statistic, a logical window 402 may be created. Since the first entry having a gender field value of "female" is located on the first data page, logical window 402 may have a logical position at data page one. Furthermore, the logical window 402 may have a size of one data page, and the counter may increment to a value of one. A beginning page identifier 404 and an ending page identifier 404 may define the logical window 402. In one embodiment, the logical window 402 includes all of the data pages between the beginning page identifier 404 and the last page identifier 406. In an alternative embodiment, the logical window 402 may include an identifiable group of pages, wherein the beginning page identifier 404 identifies the first data page referenced, and the ending page identifier 406 identifies the last data page referenced. In such an embodiment, the data pages within the logical window 402 may not be in consecutive order.

In this example, the RDBMS 302 continues to scan the index identifying entries having a value of "Female." Once the index values corresponding to data entries on the first page have been scanned, the RDBMS 302 may start scanning index values corresponding to data entries on a second data page. In such an embodiment, the ending page identifier 406 moves to a next page, and the logical window 402 increases in size to represent two data pages. In an alternative embodiment, the next page may not be in numerical order, but may be a next data page as identified in search or scan of predetermined sequence. The counter increments to a value of two in response to the change in size of the logical window 402. This process repeat, the logical window 402 increasing in size each time a data page that is not presently represented by the logical window 402 is referenced by the RDBMS 302, and the counter incrementing each time the logical window 402 changes in size.

However, once the logical window 402 reaches a maximum size 408, where the maximum size 408 represents a maximum number of data pages that may be cached in a buffer 312 during an operational data access process, the size of the logical window 402 is not expanded. In such an embodiment, another data page is referenced, and the beginning page identifier 404 changes position to the new data page number. In a further embodiment, the ending data page identifier 406 also changes to the newly referenced data page. In such an embodiment, the counter is incremented, and the new logical window 402 has a size of one page. For example, as illustrated in FIG. 4, the maximum size 408 may be ten data pages. When an eleventh data page is referenced, the logical window 402 changes its position to the eleventh data page, and the counter increments. The number of data pages that may be cached in the buffer 312 may determine the maximum size 408. Alternatively, a system administrator or database policy may determine the maximum size 408 of the logical window 402.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
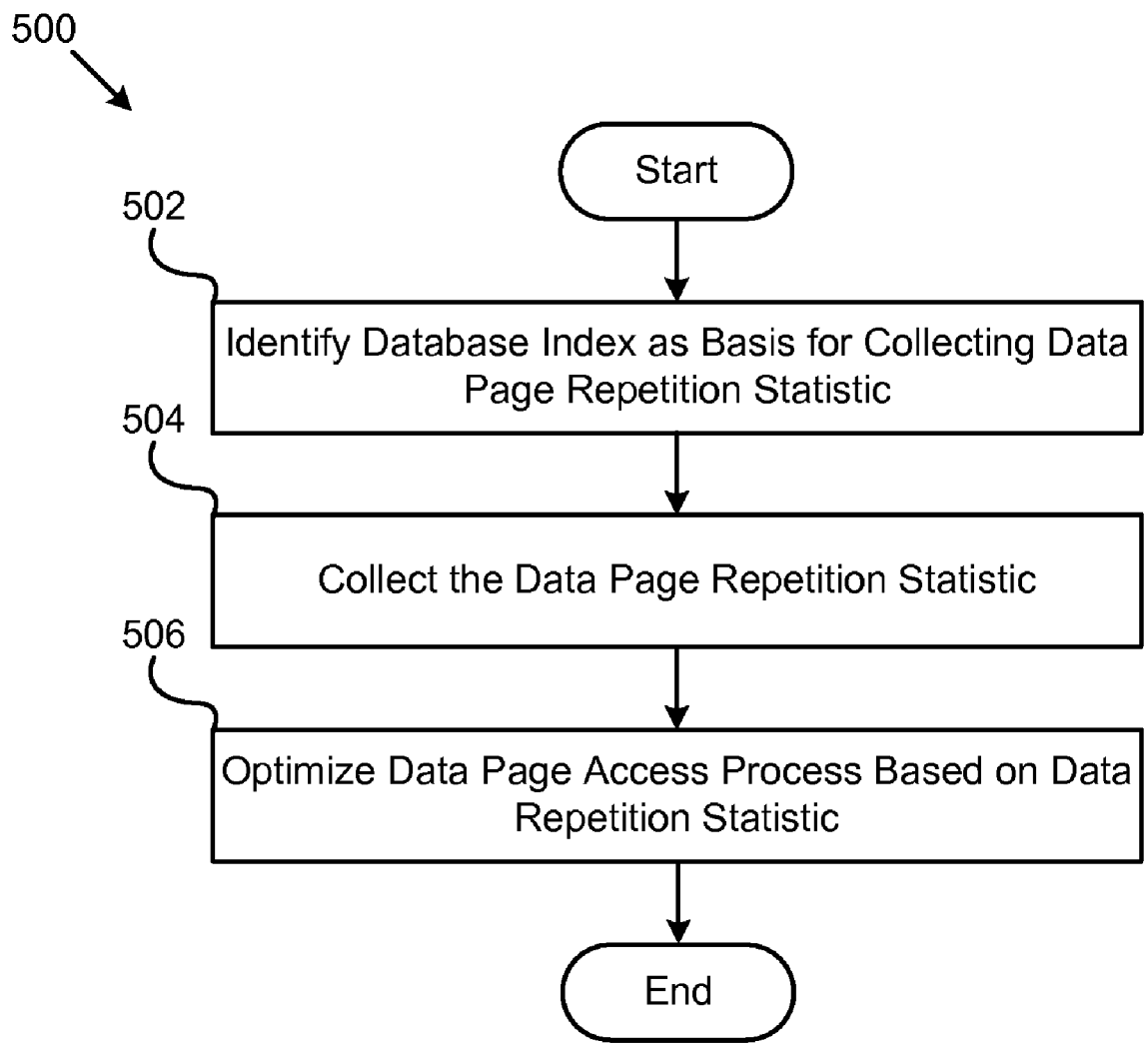
FIG. 5 is a schematic flow chart diagram illustrating one embodiment of a method for quantifying a data page repetition pattern for a database index in a database management system.

FIG. 5 illustrates one embodiment of a method 500 for quantifying a data page repetition pattern for a database index in a database management system 202. In one embodiment, the method 500 starts with identifying 502 a database index as a basis for collecting a data page repetition statistic. For example, a database administrator may select one or more indexes, or the RDBMS 302 may automatically scan all available indexes. The database management system 202 may then collect 504 the database page repetition statistic. Once the data page repetition statistic has been collected by the database management system 202, an optimizer 310 may use the data page repetition statistic to optimize 506 a data page access process, and the method 500 ends. For example, a high data page repetition statistic may indicate that certain pages are repeatedly accessed. In such an embodiment, the optimizer 310 may identify a group of operations to perform or entries to retrieve from these data pages before caching subsequent data pages.

Figure 6:
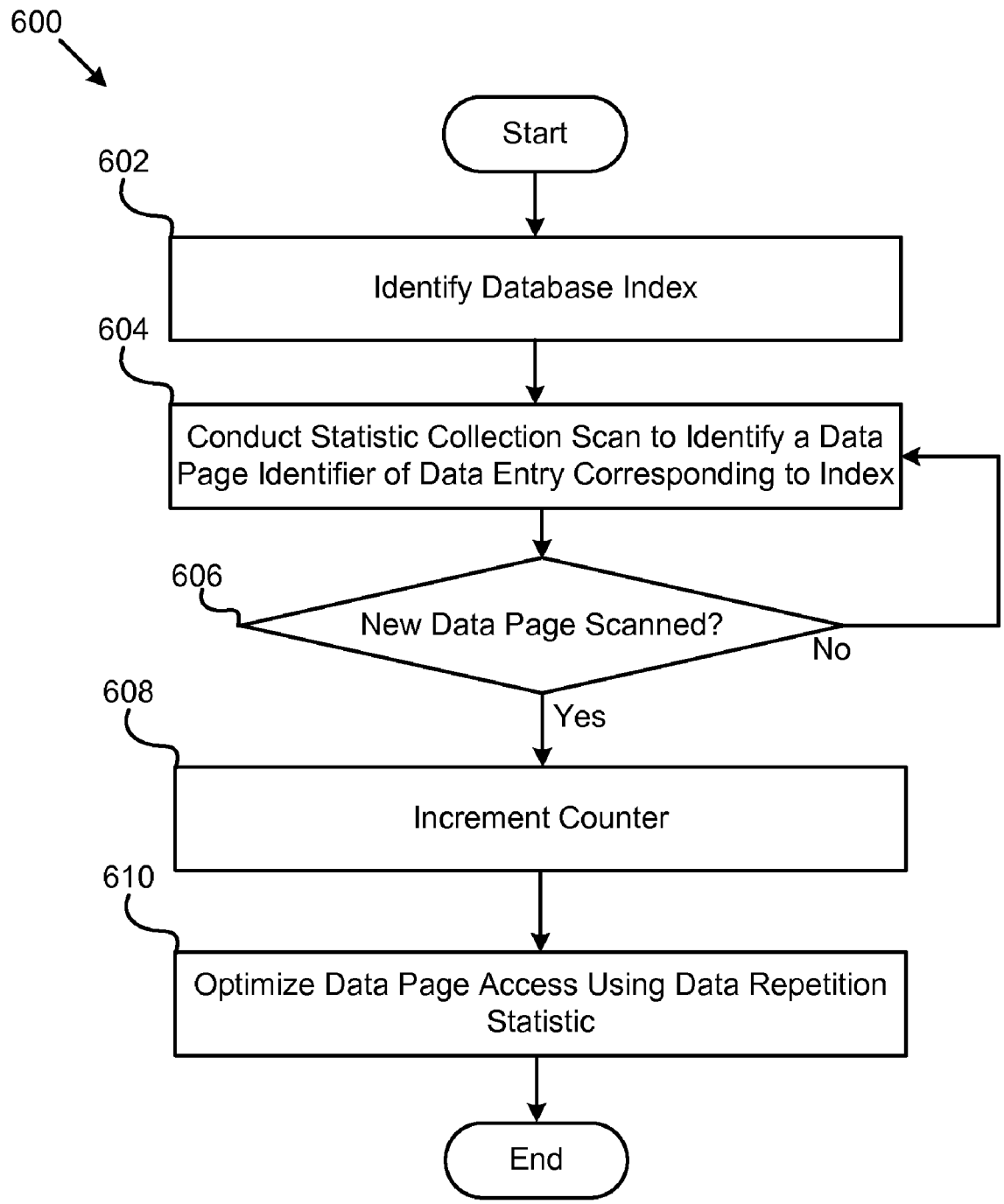
FIG. 6 is a schematic flow chart diagram illustrating an alternative embodiment of a method for quantifying a data page repetition pattern for a database index in a database management system.

In an alternative method 600 illustrated in FIG. 6, the method 600 may start when a relational database management system 304 identifies a data base index to use as a basis for collecting a data page repetition statistic. The RDBMS 302 may then conduct 604 a statistic collection scan to identify a data page identifier of a data entry corresponding to the index value. In one embodiment, the relational database management system 304 may trigger the data manager 306 to conduct 604 the scan. If it is determined 606 that another data page is to be scanned, a counter is incremented 608. If not, the RDBMS 302 continues to conduct 604 the scan. Once the RDBMS 302 has collected the data page repetition statistic, the optimizer 310 may optimize 610 data page access processes for operational queries. For example, certain indexes may have higher data page repetition statistics than others when performing a search for a specific entry or group of entries. The optimizer 310 may identify and select an index with a relatively low data page repetition statistic for searching in response to a query.

Figure 7:
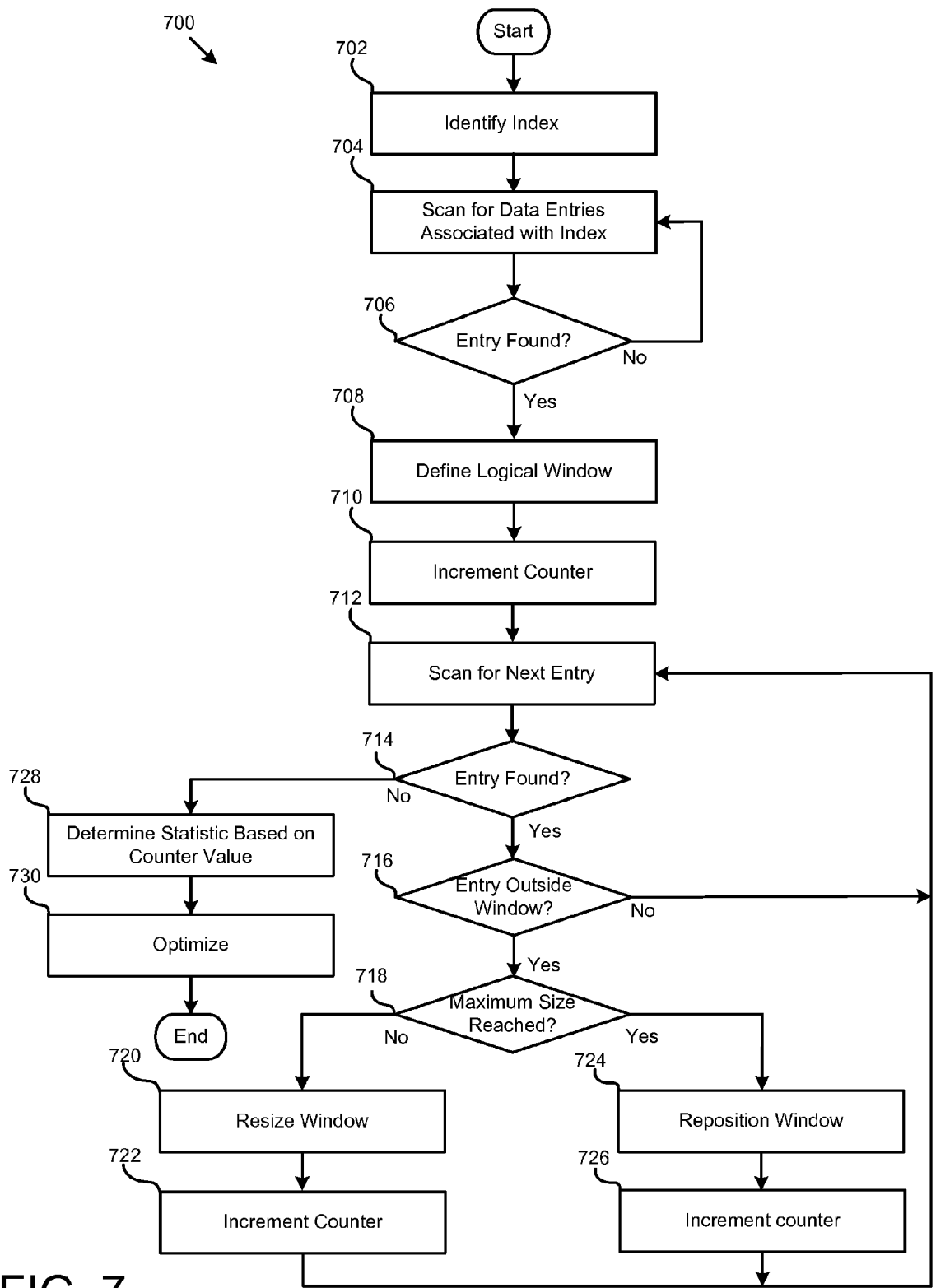
FIG. 7 is a detailed schematic flow chart diagram illustrating another embodiment of method for quantifying a data page repetition pattern for a database index in a database management system.

FIG. 7 illustrates another embodiment of a method 700 for quantifying a data page repetition pattern for a database index in an RDBMS 302. In one embodiment, the method 700 starts when the relational database management system 304 identifies 702 an index to use as a basis for a data page repetition statistic collection scan. The data manager 306 may then scan 704 the index in order from beginning to end. As long as it has been determined 706 that a different data page is not being referenced, the data manger 306 continues to scan 704 for data entries associated with the index.

However, once it is determined 706 that a different data page is being referenced, the RDBMS 302 defines 708 a logical window 402. A beginning page identifier 404 and an ending page identifier 406 may characterize the logical widow 402. Next, the RDBMS 302 increments 710 a counter, and continue to scan 712 for the next change in data page. If it is determined 714 that another change in data page has been found, and if it is determined 716 that the different data page is located outside of the logical window 402, and if it is determined 718 that the maximum size 408 has not been reached, the RDBMS 302 resizes 720 the logical window 402 (increasing it by one) and increments 722 the counter. However, if it is determined 718 that the maximum size 408 has been reached, the RDBMS 302 reposition 724 the logical window 724 at the different data page and increments 726 the counter. In one embodiment, the previous logical window is abandoned to create the new logical window. In both cases, and also in the case where it was determined 716 that the next data page is not outside the logical window 402, the data manager 306 continues to scan 712 for more data entries in the index.

Once the RDBMS 302 determines 714 that there are no more index entries, the RDBMS determines 728 the data page repetition statistic based on the value of the counter. The optimizer 310 uses the data page repetition statistic to optimize 730 subsequent query execution by factoring in the data page repetition statistic as a potential cost for using the database index.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for quantifying a data page repetition pattern for a database index in a database management system, the method comprising:

identifying a database index to provide a basis for collecting a data page repetition statistic for the database index, the database index having a database index key, the database index stored on a computer readable storage medium, wherein the data page repetition statistic quantifies a data page repetition pattern associated with database queries that reference sequential entries of the database index, the data page repetition pattern comprising a pattern of out of order references to data storage pages by the sequential entries of the database index such that a data storage page is repeatedly cached into a cache memory during an operational database search;

conducting a statistic collection scan of the database index to identify a data storage page identifier for a data entry corresponding to each database index key value in the database index, the identified database index ordered by database index key, the statistic collection scan collecting the data page repetition statistic by examining each entry in the identified database index in order;

defining a logical window to represent successive sets of data storage pages during the statistic collection scan, the logical window beginning at a first data storage page associated with a first index key in the database index and having a size of one data storage page that stores a data entry corresponding to the first index key value, the logical window simulating a model of the successive sets of data storage pages referenced by the database index that may be cached into the cache memory;

increasing the size of the logical window up to a maximum size in response to a determination that the statistic collection scan references a data storage page not included within the logical window;

incrementing a counter in response to a determination that one of the size of the logical window and a position of the logical window is adjusted due to the statistic collection scan, the data page repetition statistic based on a value of the counter; and optimizing a data page access process for a database query that is received subsequent to the statistic collection scan, the optimization based on the data page repetition statistic.

2. The method of claim 1, wherein the maximum size comprises a value equal to a number of data storage pages that are cached when a database is accessed in an operational environment, and wherein the successive sets of data storage pages in the logical window do not incur a persistent memory cost.

3. The method of claim 1, wherein the position of the logical window adjusts to a subsequent database index key value and the size adjusts to a size of one data storage page in response to the statistic collection scan referencing a data storage page not included within the logical window and the size equaling the maximum size.

4. The method of claim 1, wherein the data page repetition statistic is defined by a value of the counter that exceeds a number of unique data storage pages referenced by entries of a scanned database index.

5. The method of claim 1, wherein a minimum value of the counter comprises a number of unique data storage pages scanned by the statistic collection scan, and a maximum value of the counter comprises a number of data rows of a scanned database index scanned by the statistic collection scan.

6. The method of claim 1, wherein collecting the data page repetition statistic and optimizing the data page access process is managed autonomously by a relational database management system, and wherein the collection of the data page repetition statistic is performed during a period of minimal database activity.

7. The method of claim 1, wherein optimizing the data page access process is further based on at least one of a database size statistic, a database query selectivity statistic, and a data clustering statistic.

8. The method of claim 7, wherein collecting the data page repetition statistic is conducted substantially simultaneously with a statistic collection process for at least one of the database size statistic, the database query selectivity statistic, and the data clustering statistic.

9. A computer program product comprising a computer useable storage medium having a computer readable program for quantifying a data page repetition pattern for a database index in a database management system, wherein the computer readable program when executed on a computer causes:

identifying a database index to provide a basis for collecting a data page repetition statistic for the database index, the database index having a database index key, wherein the data page repetition statistic quantifies a data page repetition pattern associated with database queries that reference sequential entries of the database index, the data page repetition pattern comprising a pattern of out of order references to data storage pages by the sequential entries of the database index such that a data storage page is repeatedly cached into a cache memory during an operational database search;

conducting a statistic collection scan of the database index to identify a data storage page identifier for a data entry corresponding to each database index key value in the database index, the identified database index ordered by database index key, the statistic collection scan collecting the data page repetition statistic by examining each entry in the identified database index in order;

defining a logical window to represent successive sets of data storage pages during the statistic collection scan, the logical window beginning at a first data storage page associated with a first index key in the database index and having a size of one data storage page that stores a data entry corresponding to the first index key value, the logical window simulating a model of the successive sets of data storage pages referenced by the database index that may be cached into the cache memory;

increasing the size of the logical window up to a maximum size in response to a determination that the statistic collection scan references a data storage page not included within the logical window;

incrementing a counter in response to a determination that one of the size of the logical window and a position of the logical window is adjusted due to the statistic collection scan, the data page repetition statistic based on a value of the counter; and optimizing a data page access process for a database query that is received subsequent to the statistic collection scan, the optimization based on the data page repetition statistic.

10. The computer program product of claim 9, wherein the maximum size comprises a value equal to a number of data storage pages that are cached when a database is accessed in an operational environment, and wherein the successive sets of data storage pages in the logical window do not incur a persistent memory cost.

11. The computer program product of claim 9, wherein the position of the logical window adjusts to a subsequent database index key value and the size adjusts to a size of one data storage page in response to the statistic collection scan referencing a data storage page not included within the logical window and the size equaling the maximum size.

12. The computer program product of claim 9, wherein the data page repetition statistic is defined by a value of the counter that exceeds a number of unique data storage pages referenced by entries of a scanned database index.

13. The computer program product of claim 9, wherein a minimum value of the counter comprises a number of unique data storage pages scanned by the statistic collection scan, and a maximum value of the counter comprises the number of data rows of a scanned database index scanned by the statistic collection scan.

14. The computer program product of claim 9, wherein collecting the data page repetition statistic and optimizing the data page access process is managed autonomously by a relational database management system, and wherein the collection of the data page repetition statistic is performed during a period of minimal database activity.

15. The computer program product of claim 9, wherein optimizing the data page access process is further based on at least one of a database size statistic, a database query selectivity statistic, and a data clustering statistic.

16. The computer program product of claim 15 wherein collecting the data page repetition statistic is conducted substantially simultaneously with a statistic collection process for at least one of the database size statistic, the database query selectivity statistic, and the data clustering statistic.

17. A database management system for quantifying a data page repetition pattern for a database index in a database management system, the database management system comprising:
  a relational database management system configured to:
    identify a database index to provide a basis for collecting a data page repetition statistic for the database index, the database index having a database index key, the database index stored on a computer readable storage medium, wherein the data page repetition statistic quantifies a data page repetition pattern associated with database queries that reference sequential entries of the database index, the data page repetition pattern comprising a pattern of out of order references to data storage pages by the sequential entries of the database index such that a data storage page is repeatedly cached into a cache memory during an operational database search;
    conduct a statistic collection scan of the database index to identify a data storage page identifier for a data entry corresponding to each database index key value in the database index, the identified database index ordered by database index key, the statistic collection scan collecting the data page repetition statistic by examining each entry in the identified database index in order;
    define a logical window to represent successive sets of data storage pages during the statistic collection scan, the logical window beginning at a first data storage page associated with a first index key in the database index and having a size of one data storage page that stores a data entry corresponding to the first index key value, the logical window simulating a model of the successive sets of data storage pages referenced by the database index that may be cached into the cache memory;
    increase the size of the logical window up to a maximum size in response to a determination that the statistic collection scan references a data storage page not included within the logical window;
    increment a counter in response to a determination that one of the size of the logical window and a position of the logical window is adjusted due to the statistic collection scan, the data page repetition statistic based on a value of the counter; and
    optimize a data page access request that is received subsequent to the statistic collection scan, the optimization based on the data page repetition statistic;
  a data manager configured to receive the data page access request from the relational database management system; and
  a buffer manager in communication with the data manager, and configured to load data stored in a storage volume into a data access buffer in response to the data page access request.

18. The database management system of claim 17, wherein the maximum size comprises a value equal to a number of data storage pages that are cached when a database is accessed in an operational environment, and wherein the successive sets of data storage pages in the logical window do not incur a persistent memory cost.

19. The database management system of claim 17, wherein the position of the logical window adjusts to a subsequent database index key value and the size adjusts to a size of one data storage page in response to the statistic collection scan referencing a data storage page not included within the logical window and the size equaling the maximum size.

20. The database management system of claim 17, wherein the data page repetition statistic is defined by a value of the counter that exceeds a number of unique data storage pages referenced by entries of a scanned database index.

21. The database management system of claim 17, wherein a minimum value of the counter comprises a number of unique data storage pages scanned by the statistic collection scan, and a maximum value of the counter comprises a number of data rows of a scanned database index scanned by the statistic collection scan.

22. The database management system of claim 17, collecting the data page repetition statistic and optimizing the data page access process is managed autonomously by a relational database management system, and wherein the collection of the data page repetition statistic is performed during a period of minimal database activity.

23. The database management system of claim 17, wherein optimizing the data page access process is further based on at least one of a database size statistic, a database query selectivity statistic, and a data clustering statistic.

24. The database management system of claim 23, wherein collecting the data page repetition statistic is conducted substantially simultaneously with a statistic collection process for at least one of the database size statistic, the database query selectivity statistic, and the data clustering statistic.

* * * * *